UNITED STATES PATENT OFFICE

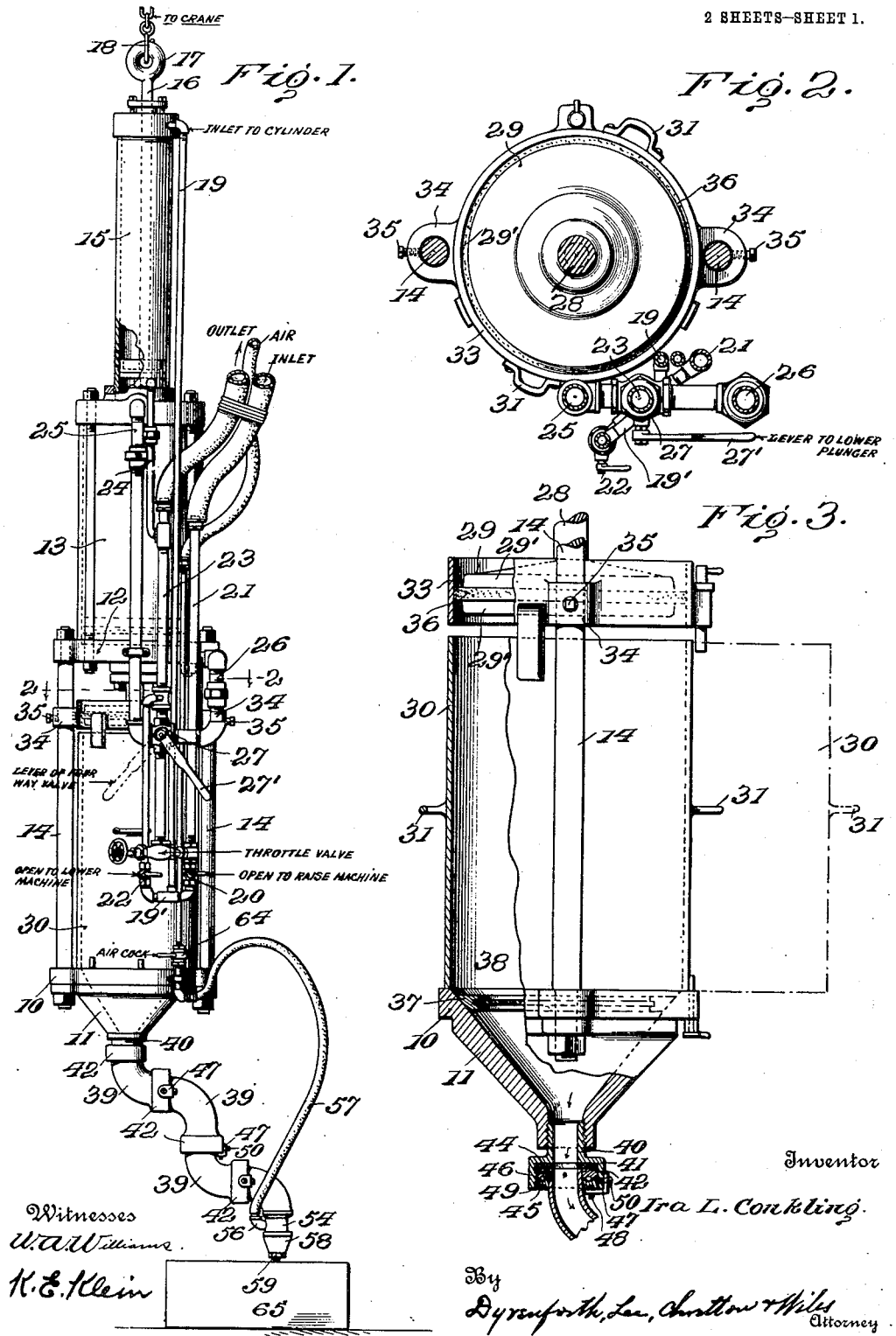

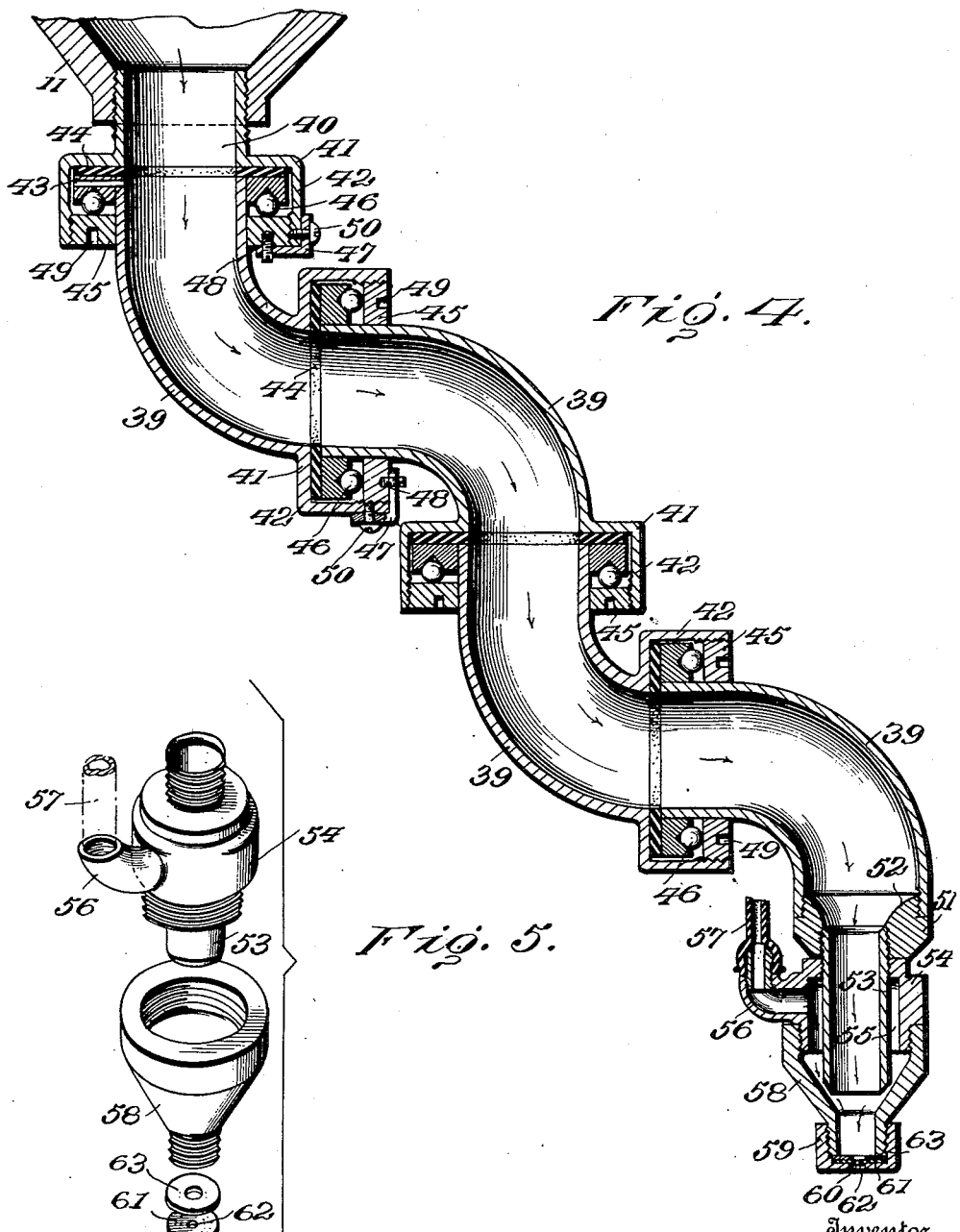

IRA L. CONKLING, OF PHILADELPHIA, PENNSYLVANIA.

APPARATUS FOR FILLING MOLDS.

1,085,973.  Specification of Letters Patent.  Patented Feb. 3, 1914.

Application filed September 22, 1910. Serial No. 583,258.

*To all whom it may concern:*

Be it known that I, IRA L. CONKLING, a citizen of the United States, residing at Philadelphia, in the county of Philadelphia and State of Pennsylvania, have invented a new and useful Apparatus for Filling Molds, of which the following is a specification.

My invention relates to an apparatus for filling molds with clay or similar stiff plastic material to be molded, and has for its object to provide means whereby molds may be loaded with the stiff plastic material properly compacted, more expeditiously, efficiently and uniformly than has heretofore been possible.

With these and other objects in view my invention consists broadly in the use of a fluid pressure to force the clay, or similar stiff plastic material to be molded, in a finely divided stream from a nozzle into the mold, the nozzle and mold being preferably relatively movable in order to direct the stream of finely divided plastic material into the various parts of the mold.

My invention further consists in providing a suitable container for the stiff plastic material, from which the plastic material is forced through a suitable conduit and in supplying a fluid pressure adjacent the nozzle of the conduit, so that the plastic material to be molded is forced from the nozzle in a finely divided condition at a great velocity.

My invention further consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever it occurs, Figure 1 is an elevation of the preferred form of my invention; Fig. 2 is a section taken on line 2, 2 of Fig. 1 and looking in the direction of the arrow; Fig. 3 is a detail view of the container for the material to be molded, and a portion of the conduit leading therefrom, said parts being broken away on one side to more clearly show the construction; Fig. 4 is an enlarged central section of the conduit and nozzle and Fig. 5 is a detail perspective view of the nozzle with the parts thereof shown in separated relation.

10 designates a ring from which depends a funnel shaped conduit portion 11, the ring being suspended from the lower end 12, of a hydraulic cylinder 13, by means of the bolt rods 14. 15 designates a second hydraulic cylinder mounted on the upper end of the cylinder 13, the piston rod 16 of which is connected to any suitable supporting device which, for the purpose of illustration, is shown as being provided with an eye 17 engaged by a supporting hook 18 that may depend from a traveling support, or may be suspended in any other manner desired.

19 designates a pipe which connects with the upper end of the cylinder 15. The pipe 19 is shown as extending down to a T-head 19' and connected to one side of the T is a valve 20 communicating with the hydraulic pressure pipe 21. 22 is a valve connected to the other side of the T head and communicating with the hydraulic outlet or exhaust pipe 23.

24 is a pipe leading from the bottom of the cylinder 15 to the exhaust or outlet pipe 23.

From the foregoing construction it will be seen that when pressure is admitted to the upper end of the cylinder, by opening the valve 20, the piston is driven down in the cylinder, and the machine consequently raised. When the valve 20 is closed and the valve 22 opened the pipe 19 is connected to the exhaust, so that the weight of the machine will operate to force the fluid out of the cylinder and into the exhaust thus permitting the machine to lower. The pipe 24 is merely to prevent pressure in the lower end of the cylinder.

Connected to the ends of the cylinder 13 are the pipes 25 and 26, the flow of fluid to and from each end of the cylinder being controlled by means of the four-way valve 27 in the ordinary manner, whereby the piston rod 28 carrying the piston 29 on its lower end may be raised and lowered for a purpose to be hereinafter described.

The particular hydraulic mechanism described forms no part of my invention and is merely illustrated in order to show a complete construction. It is advantageous to be able to raise and lower the whole machine as desired, and for this purpose the hydraulic cylinder 15 is provided. Means must also be provided for forcing the clay through the conduit, and the piston 29, operated by means of the hydraulic cylinder 13, effects this function.

Mounted upon the ring 10 is the container 30 for the clay or other stiff plastic material, the container being shown as an open ended cylinder having handles 31 by means of which it can be readily removed from and placed in position on the ring 10. The ring 10 is shown as provided with a pair of pins 32 which project up from one side of the ring, and on the other side I provide a sliding pin or bolt 32' whereby the lower end of the cylinder is held in proper position. The clay to be molded is packed into the cylinder before it is placed in position, and the cylinder can then be picked up and placed in position without the material falling therefrom.

In the form of my invention shown I have provided a ring 33 supported on the rods 14 above the container 30 by means of the perforated lugs 34 and set screws 35 passing through the lugs and into which the piston 29 enters at the upper end of its movement. The ring 33 is shown as provided with a pair of downwardly extending lugs 33' on one side of the ring and a sliding bolt 33'' on the other side, whereby the upper end of the cylinder is held in proper position. As I form the ring 33 of the same diameter as the cylinder 30, the ring will operate to prevent the cylinder rising when the piston 29 is raised. In the form of my invention shown the piston 29 is formed of two plates 29', between which is secured a packing ring 36 of rubber or other desired material.

Preferably and as shown I mount in the upper end of the conical conduit 11 a ring 37, carrying a wire screen 38 through which the material is forced and which prevents the entrance of stone or other foreign matter into the conduit.

As will be readily understood when the lever 27' of the four-way valve 27 is operated in the proper direction pressure will be admitted above the piston in the cylinder 13, the piston 29 will move down through the container 30 and force the clay through the conduit 11. After all the material is out of the container the lever 27' is moved in the reverse direction whereby the piston 29 is withdrawn from the container when the container can be removed from position and either refilled, or a previously filled container substituted.

In order that the nozzle may be moved to any position desired I connect to the lower end of the conical shaped conduit portion 11 a series of short curved sections of pipe 39, which are coupled together to rotate one upon the other by any suitable means. Preferably I employ the novel means shown which I will now describe.

40 indicates a short section of pipe screw threaded into the lower end of the conical conduit 11, the pipe being formed with a flange 41 having a collar 42 extending therefrom. The end of the section 39 to be connected to the section 40 is provided with an outwardly extending flange 43, the face of which is adapted to seat against the packing 44, located between the flanges 41 and 43.

45 is a ring surrounding the section 39 and adapted to be screwed into the collar 42. Preferably, and as shown, I provide shallow grooves in the adjacent faces of the ring 45 and the flange 43 forming a raceway for the balls 46, whereby the parts may turn easily.

47 is an L-shaped plate provided with a projection 48 adapted to engage one of the openings 49 in the outer face of the ring 45, the plate being secured to the flange 42 by means of the screw 50. The holes 49, in addition to forming the means for locking the ring also provide a means adapted to be engaged by a spanner when it is desired to take the sections apart. The other joints between the sections are constructed in identically the same manner and need no further description. The end section 39 of the conduit is preferably screw threaded and is provided with a tip 51, preferably provided with a conical inner wall 52 to reduce the diameter of the opening in the conduit.

The particular form of nozzle I have illustrated, comprises a tubular section 53 screw threaded into the end of the tip 51 onto which is threaded the annular casing 54 having an enlarged annular space 55 connected by means of pipes 56, 57 with a suitable source of fluid under pressure, such for instance as compressed air, and 64 is a cock for controlling the flow.

58 is a conical cap screw threaded onto the end of the casing 54, said cap surrounding the end of the pipe 53.

59 is a tip threaded onto the end of the cap 58, said tip at its lower end being provided with an opening 60 through which the clay is discharged.

61 is a rubber washer having a perforation 62 therethrough of smaller diameter than the opening 60 but in line therewith, and 63 is a metallic washer interposed between the rubber washer and the end of the conical cap 58 to hold the washer 61 in position. The purpose of the rubber washer 61 is to accommodate portions of clay of different sizes, as it is obvious that by reason of the flexibility and expansibility of the rubber the particles of different sizes may pass therethrough, and further that the quantity of material discharged will increase as the air pressure and the rate of feed of the material is increased so that the size of the opening accommodates itself to the amount of clay passing therethrough. The minute discharge opening, in conjunction with the compressed air which commingles with the clay to be molded, at the delivery end of the pipe 53 breaks up the clay into minute particles and delivers the same from the nozzle with great velocity.

In the operation of the machine a cylinder 30 filled with clay, or other stiff plastic material to be molded is placed in position on the ring 32. The machine is adjusted to bring the nozzle in proper relation to the mold, or other receiver for the material, by means of the hydraulic cylinder 15, a mold being indicated at 65. Hydraulic pressure is now admitted into the upper end of the cylinder 13 to force the piston 36 into the cylinder 30, thus forcing the clay through the conical conduit 11 and the flexible sections 39 into the nozzle. Compressed air or other fluid under pressure is admitted through the pipe 57 into the annular space 55, which discharges the clay through the discharge end of the nozzle in minute particles having great velocity, the clay leaving the nozzle in the form of a spray. By moving the nozzle around, which movement is permitted by the jointed sections of the conduit, and the movement of the entire machine, which can swing freely because it is suspended by the eye 17, the clay may be directed in any desired direction to the surfaces of the mold. It is found that when so introduced into a mold it adheres much more closely to the surface of the mold and presents a much sharper outline when removed from the mold than where the mold is packed by hand. In addition the mold can be much more rapidly filled and an absolutely homogeneous mass obtained.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In an apparatus for filling molds with clay or similar plastic material to be molded, the combination with a conduit formed with a seat at its upper end, an open ended receptacle for the clay removably supported on the seat, a nozzle, a flexible pipe connecting the nozzle to the conduit, a piston, and means for operating the piston to cause it to force clay from the receptacle to the nozzle.

2. In an apparatus for filling molds with clay or similar stiff plastic material to be molded, the combination with a conduit formed with a seat at its upper end, an open ended receptacle for the clay removably supported on the seat, latches for locking the receptacle on the seat, a nozzle, a flexible pipe connecting the nozzle to the conduit, a piston and means for operating the piston to cause it to force the clay from the receptacle to the nozzle.

3. In an apparatus for filling molds with clay or similar stiff plastic material to be molded, the combination with a receptacle for clay, a conduit leading from the receptacle, a series of pipe sections, a plurality of joints between the sections, one end of said series being connected to the conduit, a nozzle connected to the other end of the series, the joints between the sections permitting the nozzle to be turned in any direction, and means for forcing clay from the receptacle through the conduit and nozzle.

4. In an apparatus for filling molds with clay or similar stiff plastic material to be molded, the combination with a receptacle for the clay, a conduit leading from the receptacle, a series of curved pipe sections, a plurality of joints between the sections permitting each section to turn axially on the adjacent section, said series being connected at one end to said conduit, a nozzle connected to the other end of said series, and means for forcing the clay to be molded from the receptacle through the conduit and nozzle.

In testimony whereof I affix my signature in presence of two witnesses.

IRA L. CONKLING.

Witnesses:
 MARY V. O'BRIEN,
 JOS. J. FREDERICKSON.